US006866588B2

(12) United States Patent
Doornbos

(10) Patent No.: US 6,866,588 B2
(45) Date of Patent: Mar. 15, 2005

(54) ONE-WAY DAMPER

(75) Inventor: David A. Doornbos, Manteno, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/167,215

(22) Filed: Jun. 11, 2002

(65) Prior Publication Data
US 2003/0228918 A1 Dec. 11, 2003

(51) Int. Cl.[7] .................................................. F16D 7/02
(52) U.S. Cl. ...................... 464/40; 464/57; 192/12 BA
(58) Field of Search ............................. 464/57, 30, 40, 464/160; 192/56.2, 12 B, 12 BA; 188/290, 291; 74/573 F

(56) References Cited

U.S. PATENT DOCUMENTS

| 4,697,673 A | * | 10/1987 | Omata | 188/291 |
| 4,830,151 A | * | 5/1989 | Numata | 188/290 |
| 5,211,269 A | * | 5/1993 | Ohshima | 188/290 |
| 5,460,252 A | * | 10/1995 | Kosugi et al. | 188/291 |
| 5,497,863 A | | 3/1996 | Schmidt et al. | |
| 5,718,309 A | | 2/1998 | Kariya | |
| 5,887,930 A | * | 3/1999 | Klein | 296/37.12 |
| 6,298,960 B1 | | 10/2001 | Derr | |

* cited by examiner

Primary Examiner—Kenn Thompson
(74) Attorney, Agent, or Firm—Mark W. Croll; Paul F. Donovan

(57) ABSTRACT

A damper includes a housing and a rotor. A portion of the rotor extends outwardly of the housing and has a gear rotatably disposed thereon. A coil spring encircles the portion of the rotor, and has an end segment secured to the gear. Rotation of the gear in one direction tightens the grip of the spring on the rotor, and rotation of the gear in the opposite direction loosens the grip of the spring on the rotor.

23 Claims, 2 Drawing Sheets

ONE-WAY DAMPER

FIELD OF THE INVENTION

The present invention pertains generally to movement dampers such as those used with closure mechanisms on kitchen drawers, sliding racks, desk drawers and other cabinets, automobile consoles, gloveboxes, and the like. More particularly, the invention relates to a one-way movement damper that may be used with such mechanisms for controlling the rate of movement in at least one direction.

BACKGROUND OF THE INVENTION

Movement dampers are used in various assemblies to control the movement of assembly components. For example, in furniture and cabinetry it is known to use dampers for controlling movement of a drawer or door in at least one direction. In automobiles, it is known to use dampers on glovebox and console doors, and the like.

Many such drawers, doors and components are provided with automatic closure mechanism that utilize spring assists for moving the component in one direction, typically in the closing direction. With spring assists, the component can be made self-closing, requiring only an initial start to unseat it from a secured, opened position. Although spring or other assists are beneficial in reducing the effort required for closing, and for ensuring that the component closes completely, an assist of sufficient strength to close automatically a heavily loaded drawer or the like can result in abrupt movements and rapid closing, with significant impact upon reaching the fully closed position. Therefore, it is advantageous to temper, or damp the action of the spring, so that the drawer, door or the like closes more gently.

Since the opening motion of a door or drawer may be done without mechanical assist, and in fact may itself be restrained by the expansion of an extension spring used to assist closing, further damping is not needed and may be undesirable. Therefore, often it is desirable to deactivate or circumvent the damping mechanism during operation in one direction, such as when a drawer is being pulled open. A damper that is operated in one direction is referred to commonly as a "one-way" damper, and a damper operated in both directions commonly is referred to as a "two-way" damper.

It is known to use a damper to provide rotational resistance of a gear on a mechanism such as an automatic closer through driving engagement between the gear of the mechanism and a gear of the damper. Resistance to rotation of the gear on the damper, which is inherent in the structure of the damper, is thereby imparted to rotation of the mechanism gear. Such damping devices frequently are referred to as gear dampers.

Some gear dampers are operated as one-way dampers through the selective engagement or disengagement of the cooperating gears. However, structure necessary to engage and disengage the gears selectively adds complexity to the device, and can be a source of potential failure.

Alternatively, the damper itself can be provided with a clutch. The clutch allows the gear of the damper to be fully engaged with a damping portion of a rotor in the damper when the gear is rotated in one direction, and to be effectively disengaged from the rotor, and therefore freewheeling, when the gear is rotated in the opposite direction. Known dampers of this type have used internal clutch springs, requiring the use of two-piece rotors. A two-piece rotor can introduce an undesirably large degree of play or looseness in the device, and can become a point of additional component wear, and potential failure. Internal leakage of the damping fluid, typically a viscous fluid, can contaminate an internal clutch spring, rendering the clutch nonfunctioning.

Therefore, it is desirable to provide a one-way damper having a one-piece rotor, and a clutch that is less susceptible to failure than are known damper clutch structures.

What is needed in the art is a damper that is easier to assemble, and more reliable in operation than are known designs.

SUMMARY OF THE INVENTION

The present invention provides a gear damper with an external clutch spring and a one-piece rotor, retaining advantages of previous designs while limiting or eliminating many of the disadvantages of the previous designs.

The invention provides, in one form thereof, a damper with a housing retaining a damping component, and a rotor rotationally disposed in the housing. Rotation of the rotor in the housing is restricted by influence from the damping component. The rotor has a portion extending outwardly of the housing. A gear is disposed on the portion of the rotor; and a mechanical link between the gear and the portion of the rotor provides selective driving engagement between the gear and the rotor, when the gear is rotated in one direction.

The invention provides, in another form thereof, a one-way gear damper with a housing defining a chamber, and a rotor having a first portion rotationally disposed in the chamber and a second portion extending outwardly of the housing. A gear is rotatably disposed on the second portion of the rotor. A spring provides selective driving engagement between the gear and the second portion of the rotor. A seal is provided on the rotor between the housing and the spring.

In a further form thereof, the invention provides a one-way gear damping assembly with a damper housing defining a chamber and a rotor having a first portion rotationally disposed in the chamber and a second portion extending outwardly of the housing. A fluid seal is provided on the rotor between the chamber and the second portion of the rotor. A damper gear is rotatably disposed on the second portion of the rotor. The damper gear includes an aperture receiving the second portion of the rotor, and allowing relative rotation between the damper gear and the rotor. The damper gear defines a cavity therein around the second portion. The aperture extends from a bottom of the cavity. A link selectively interconnects the damper gear and the rotor; and a device gear for operating a device, is drivingly engaged with the damper gear.

An advantage of the present invention is providing one-way damper that is selectively activated and deactivated in a simple and reliable manner.

Another advantage of the present invention is providing a clutch in a one-way damper that can be used with a one-piece rotor that is less susceptible to wear than previous designs using two-piece rotors.

A still further advantage of the present invention is providing a one-way damper that has less play than previous designs.

A still further advantage of the present invention is providing a compact damper with a spring clutch isolated from damper fluid.

Other features and advantages of the invention will become apparent to those skilled in the art upon review of the following detailed description, claims and drawings in which like numerals are used to designate like features.

Figure 1:
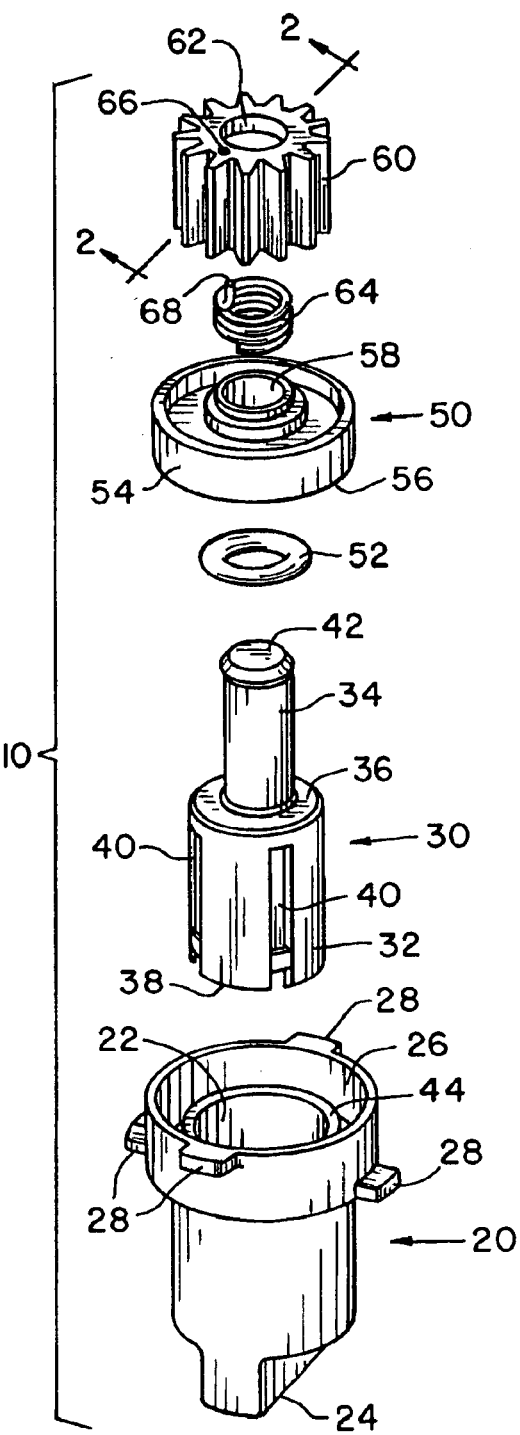
FIG. 1 is an exploded view of a damper in accordance with the present invention.

Before the embodiments of the invention are explained in detail, it is to be understood that the invention is not limited in its application to the details of construction and the arrangements of the components set forth in the following description, or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising", and variations thereof, is meant to encompass the items listed thereafter and equivalents thereof, as well as additional items and equivalents thereof.

DETAILED DESCRIPTION OF THE PREFERRED EMBODIMENT

Figure 3:
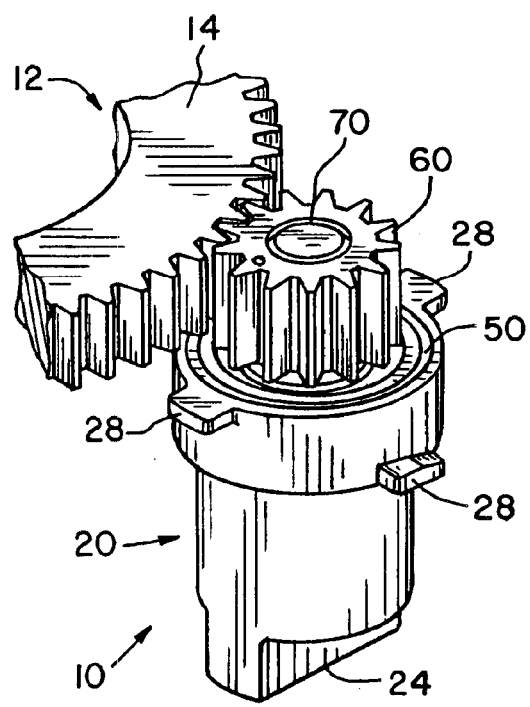
FIG. 3 is a perspective view of the damper shown in the previous figures, installed for controlling the movement of a gear from a mechanism.

Referring now more specifically to the drawings, and to FIG. 1 in particular, numeral 10 designates a damper of the present invention, which can be used for controlling the movement of a device 12 (FIG. 3), which maybe a drawer slide, a door closer or the like in furniture, automobiles or other devices. It is anticipated that damper 10 of the present invention will have a wide range of uses and applications, and should not be interpreted as being limited to the few used as examples herein. Device 12 includes a gear 14 drivingly engaged with damper 10.

Damper 10 includes a housing 20 defining a chamber 22 having a closed bottom 24 and an open top 26. One or more tabs or fixtures 28 can be provided on housing 20, to secure housing 20 as desired in device 12.

A rotor 30 is disposed partially within chamber 22, and is rotatable about its longitudinal axis. Rotor 30 includes a first portion 32 substantially contained within chamber 22, and a second portion 34 extending outwardly from housing 20. Rotation of rotor 30 in chamber 22 is retarded or inhibited by operation of a damping component in chamber 22. As those skilled in the art will understand readily, the damping component may include a damping fluid contained within chamber 22. First portion 32 is cooperatively shaped in association with chamber 22 to experience the desired damping effect to the rotation thereof from the resistance provided from the fluid or other damping component contained in chamber 22.

First portion 32 of rotor 30 is of greater diameter than is second portion 34, thereby defining a shoulder 36 at the transition from first portion 32 to second portion 34. First portion 32 fits closely within chamber 22, and may be of several configurations to achieve the desired damping effect. As shown, first portion 32 is cylindrical, with an open end 38 at the opposite end of first portion 32 from shoulder 36, and a plurality of slits or openings 40 extending along the length thereof. Second portion 34 is configured substantially as a stub shaft projecting from housing 20, in the assembled damper 10, and includes a distal end 42. Advantageously, rotor 30 is formed as a one-piece, monolithic structure including first portion 32 and second portion 34.

Shoulder 36 is associated with a ledge 44 in chamber 22 to function in cooperation with a seal 50 to isolate chamber 22, and any damping fluid therein, and prevent leaking of fluid from chamber 22. Seal 50 includes an O-ring seal 52 or other suitable seal on the periphery of second portion 34 of rotor 30, adjacent shoulder 36. A cap 54 is disposed on second portion 34, to close open top 26. Cap 54 includes a bottom 56 that seats on shoulder 36 and/or ledge 44, to provide a substantially fluid tight closure of open top 26. An opening 58 in bottom 56 allows cap 54 to be slid along second portion 34, from distal end 42 to shoulder 36. O-ring seal 52 effectively seals the area of second portion 34 adjacent bottom 56.

A damper gear 60 is provided at distal end 42 of second portion 34. Damper gear 60 has an axial aperture 62 there through of sufficient diameter such that damper gear 60 is somewhat loosely fitted on second portion 34. Damper gear 60 and rotor 30 can be rotated independently relative to each other. A mechanical link between damper gear 60 and rotor 30 is provided by a coil spring 64 disposed on second portion 34 and secured to damper gear 60. Spring 64 can be provided with a wax or other coating to provide corrosion resistance, reduce friction, and minimize noise. Aperture 62 includes an axial slot 66, and spring 64 has an end segment 68 that is secured in slot 66 so that spring 64 is thereby keyed to damper gear 60 and does not rotate within or relative to damper gear 60. A ring 70 (FIG. 3) provides an axial stop, such that damper gear 60 can not slide off distal end 42.

Coil spring 64 is somewhat snuggly fit on second portion 34, to grip the rotor more tightly as damper gear 60 is rotated in one direction, and to loosen the grip therebetween if damper gear 60 is rotated in the opposite direction.

At an inner face 72 of damper gear 60, a cavity 74 is formed substantially surrounding second portion 34 extending therethrough. A bottom 76 of cavity 74 is provided with aperture 62. Cavity 74 is of sufficient depth and diameter to substantially contain spring 64 therein, between bottom 76 and cap 64.

Figure 2:
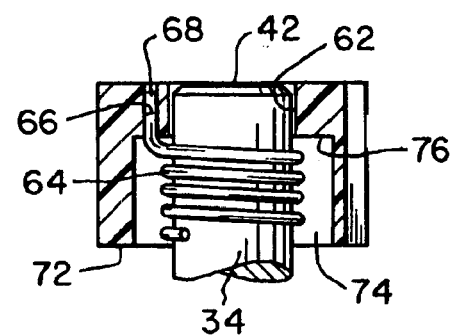
FIG. 2 is a cross-sectional view, in assembled form, of the damper shown in FIG. 1, taken on line 2—2 of FIG. 1.

It should be understood that the assembly of housing 20, rotor 30, seal 50 and cap 54 would function as a two-way damper for a tightly fit damper gear 60 secured on second portion 34 of rotor 30. However, coil spring 64 functions as a clutch between second portion 34 and a damper gear 60 more loosely fit on second portion 34. With end segment 68 of coil spring 64 keyed to damper gear 60, coil spring 64 rotates together with damper gear 60. With reference to the structure shown in FIG. 2, if device gear 14 drives damper gear 60 in a clockwise direction, spring 64 is caused to grip second portion 34 of rotor 30 more tightly. Thus, rotor 30 is caused to rotate together with damper gear 60, and a damping effect is imparted to the rotation of device gear 14 from the rotational resistance of first portion 32 of rotor 30 in chamber 22 of housing 20. Conversely, if device gear 14 drives damper gear 60 in a counterclockwise direction, the grip of spring 64 on second portion 34 of rotor 30 is loosened. Damper gear 60 can rotate on second portion 34 without driving rotor 30, and no damping effect is imparted to the rotation of device gear 14.

Figure 4:
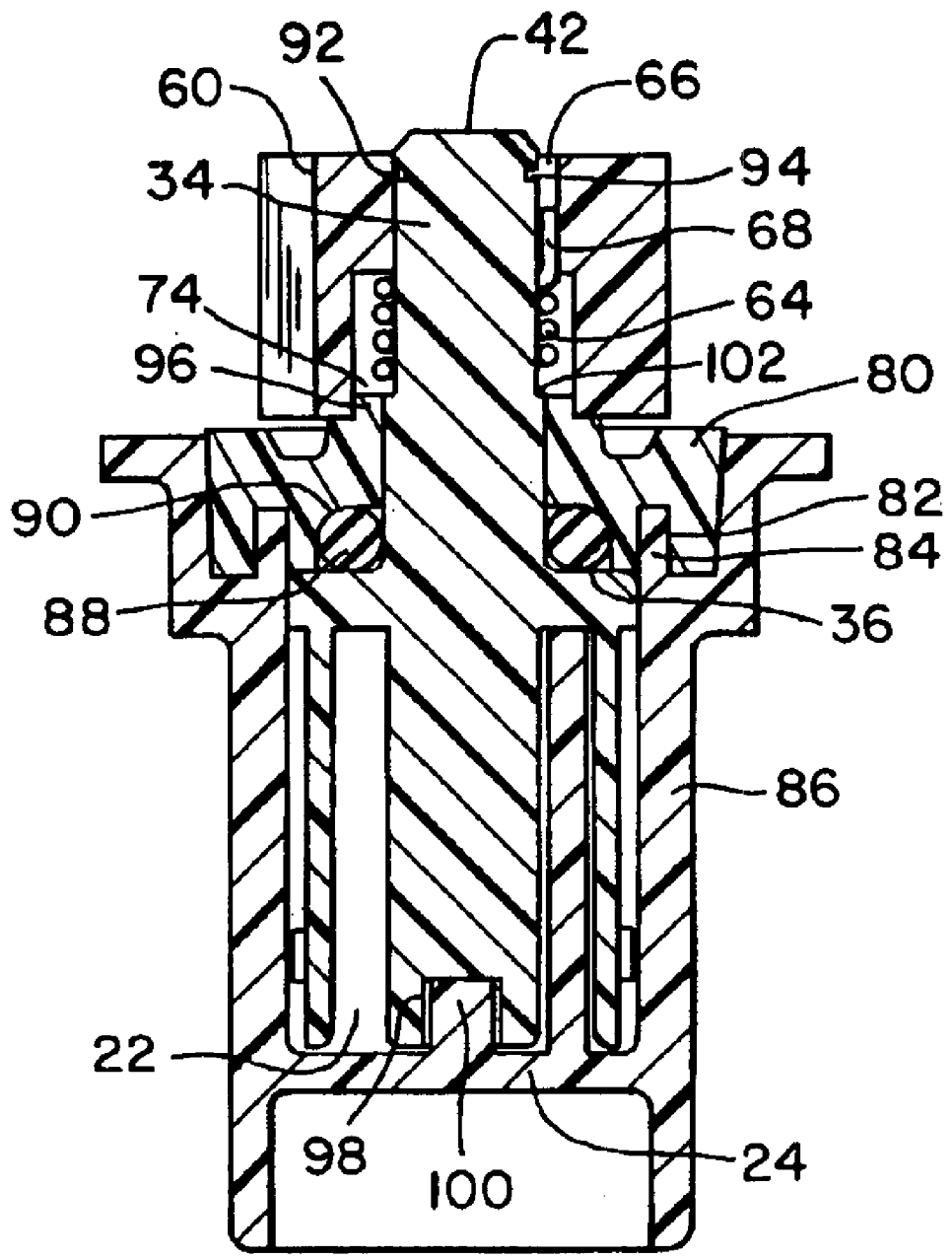
FIG. 4 is an enlarged cross-sectional view, in assembled form, of a second, preferred embodiment of a damper in accordance with the present invention.

FIG. 4 illustrates a second embodiment of the invention. A cap 80 defines a channel 82 on a bottom side thereof, and engages an inner rim 84 of a modified housing 86. An O-ring 88 is disposed in a recess 90 of cap 80, generally between cap 80, second portion 34 and shoulder 36. Cap 80 is ultrasonically welded to housing 86. Thus, O-ring 88 provides a seal radially between cap 80 and rotor 30, to prevent fluid from leaking around rotor 30. Weld secures cap 80 to housing 86, and prevents fluid leakage around cap 80. Damper gear 60 is secured to rotor 30 via a plurality of nibs, a ring or other projection or projections 92 engaged in an annular groove 94 of rotor 30. Cap 80 defines an upwardly extending collar 96 sized to be received in cavity 74. The additional bearing area between cap 80 and damper gear 60 along collar 96 provides greater resistance to side load pressure against damper gear 60. A hole 98 is defined in the end of rotor 30 in housing 86, and a post 100 defined in chamber 22 by bottom 24 of housing 86 extends into hole 98, to further stabilize rotor 30. Second portion 34 of rotor 30 is provided with a step 102 forming an axial stop beyond which spring 64 can not advance. Thus, during use, spring 64 is prevented from "walking" along second portion 34, and end segment 68 of spring 64 remains in axial slot 66.

Assembly is performed by positioning O-ring 88 into recess 90 of cap 80, and placing cap 80 with O-ring 88 therein onto rotor 30. End segment 68 of spring 64 is inserted into axial slot 66 of damper gear 60, with spring 64 substantially within cavity 74. The assembly of damper gear 60 and spring 64 is pressed onto rotor 30 by sliding distal end 42 through aperture 62 until projection or projections 92 snap into groove 94. Rotor 30 is positioned in housing 86, with post 100 disposed in hole 98. Cap 80 is then ultrasonically welded to housing 86.

The present invention allows a common damper assembly to be used for both one-way and two way damping, with changes required only to the damping gear used, and the inclusion of a clutch spring in the one-way damping assembly. A one-piece rotor can be used, minimizing play in the assembly and eliminating points of potential wear and failure. The clutch is more adequately isolated from fouling by damping fluids, and is thereby less prone to failure, than are previously known designs. A simple, cost effective clutch is provided for a one-way damper.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A damper comprising:
   a housing;
   a rotor rotatably disposed in said housing, said rotor having a portion extending outwardly of said housing;
   a gear disposed on said portion of said rotor, said gear having a cavity;
   a mechanical link between said gear and said portion of said rotor, said mechanical link having an end segment secured to an axial slot provided in said gear, said axial slot being substantially parallel with said rotor, and said mechanical link being substantially disposed in said cavity of said gear, said mechanical link providing selective driving engagement between said gear and said portion when said gear is rotated in one direction; and
   a seal on said rotor between said mechanical link and said housing.

2. The damper of claim 1, said mechanical link comprising a spring.

3. The damper of claim 2, said spring being a coil spring disposed around said portion of said rotor.

4. The damper of claim 3, said spring having an end segment secured to said gear.

5. The damper of claim 4, said spring being disposed in said cavity.

6. The damper of claim 5, the seal being between said spring and said housing.

7. The damper of claim 6, said seal including a cap on said shaft between said housing and said spring.

8. The damper of claim 7, said seal including an O-ring between said cap and said housing.

9. The damper of claim 1, said rotor being monolithic.

10. A one-way gear damper comprising:
    a housing defining a chamber;
    a rotor having a first portion rotationally disposed in said chamber and a second portion extending outwardly of said housing;
    a gear rotatably disposed one said second portion of said rotor, said gear defining a cavity in one face thereof;
    a coil spring disposed on said second portion of said rotor, said spring having an end segment secured to a slot provided in said gear, said spring being disposed in said cavity of said gear, said spring providing selective driving engagement between said gear and said second portion of said rotor;
    an O-ring seal on said rotor between said housing and said spring; and
    a cap on said rotor between said spring and said housing.

11. The one-way gear damper of claim 10, said rotor being monolithic.

12. A one-way gear damper comprising:
    a damper housing defining a chamber;
    a rotor having a first portion rotatably disposed in said chamber and a second portion extending outwardly of said housing;
    a fluid seal on said rotor between said chamber and said second portion of said rotor;
    a damper gear rotatably disposed on said second portion of said rotor, said damper gear including an aperture receiving said second portion and allowing relative rotation between said damper gear and said rotor, said damper gear defining a cavity therein around said second portion, said aperture extending from a bottom of said cavity;
    a link selectively interconnecting said damper gear and said rotor, said link surrounding said second portion of said rotor, and said link having an end segment secured to said damper gear, said link being substantially disposed in said cavity of said damper gear;
    a cap between said housing and said link, said cap including a collar, such that said cap extends into said housing and said collar extends into said cavity of said damper gear; and
    a device gear for operating a device, said device gear being drivingly engaged with said damper gear.

13. The one-way gear damper of claim 12, said link comprising a coil spring surrounding said second portion of said rotor, said spring having an end segment secured to said damper gear.

14. The one-way gear damper of claim 13, said spring being disposed in said cavity.

15. The one-way gear damper of claim 12, said seal including an O-ring.

16. The one-way gear damper of claim 12, said link comprising a coil spring surrounding said second portion of said rotor, said aperture including a slot, and said spring including an end segment disposed in said slot.

17. The one-way gear damper of claim 16, said second portion of said rotor having a step restricting axial travel of said coil spring along said second portion.

18. The one-way gear damper of claim 12, including an O-ring seal between said cap and said rotor.

19. The one-way gear damper claim 18, said cap sealed to said housing by ultrasonic welding.

20. The one-way gear damper of claim 12, said cap defining a channel, and said housing having an inner rim disposed in said channel.

21. The one-way gear damper of claim 20, said cap sealed to said housing by ultrasonic welding.

22. The one-way gear damper of claim 12, said rotor defining a hole at an end thereof disposed in said housing, and said housing having a post disposed in said hole in said rotor.

23. The one-way gear damper of claim 12, said rotor defining an annular groove in said second portion, and said damper gear including a projection received in said annular groove of said rotor.

* * * * *